US005196844A

United States Patent [19]

Tomisawa et al.

[11] Patent Number: 5,196,844

[45] Date of Patent: Mar. 23, 1993

[54] METHOD AND APPARATUS FOR DETECTING REFERENCE ROTATIONAL ANGLE FOR EACH CYLINDER IN MULTIPLE-CYLINDER INTERNAL COMBUSTION ENGINE

[75] Inventors: Naoki Tomisawa; Takaaki Mogi, both of Isesaki, Japan

[73] Assignee: Nissan Motor Company, Ltd., Yokohama, Japan

[21] Appl. No.: 397,260

[22] Filed: Aug. 22, 1989

[51] Int. Cl.[5] .......................... F02P 7/073; F02P 7/04; G01P 3/486

[52] U.S. Cl. .............................. 340/870.29; 73/117.3; 324/207.25; 324/391; 364/431.03

[58] Field of Search ..................... 340/870.29; 73/116, 73/119 A, 117.3; 364/431.03; 324/392, 207.22, 207.25, 391

[56] References Cited

U.S. PATENT DOCUMENTS

| | | | |
|---|---|---|---|
| 3,930,201 | 12/1975 | Ackermann et al. | 324/207.22 |
| 4,112,887 | 9/1978 | Château | 123/117 D |
| 4,262,251 | 4/1981 | Fujishiro et al. | 324/392 |
| 4,356,447 | 10/1982 | Honig et al. | 324/392 |
| 4,413,508 | 11/1983 | Kawamura et al. | 324/391 |
| 4,607,523 | 8/1986 | Takahashi et al. | 73/116 |
| 4,700,305 | 10/1987 | Lotterbach et al. | 364/431.03 |
| 4,814,704 | 3/1989 | Zerrien et al. | 324/207.22 |

FOREIGN PATENT DOCUMENTS

| | | |
|---|---|---|
| 0150642 | 8/1985 | European Pat. Off. . |
| 2458946 | 6/1976 | Fed. Rep. of Germany . |
| 2280801 | 2/1976 | France . |
| 2620816 | 3/1989 | France . |
| 1-39450 | 3/1989 | Japan . |
| 2003671 | 3/1979 | United Kingdom . |
| 2058358 | 4/1981 | United Kingdom . |
| WO83/04283 | 12/1983 | World Int. Prop. O. . |

*Primary Examiner*—Donald J. Yusko
*Assistant Examiner*—John Giust
*Attorney, Agent, or Firm*—Foley & Lardner

[57] ABSTRACT

Disclosed is an apparatus for detecting the reference rotational angle for each cylinder in a multiple-cylinder internal combustion engine, in which a reference pulse signal is output at a position of a predetermined rotational angle of the engine at a specific stroke of each cylinder synchronously with the revolution of the engine, a cylinder-discriminating pulse signal is put out just after termination of specific one of the reference pulse signal, the precedent and present values of elements, concerning the time, of the pulse signal are detected, and when the present value is smaller than the precedent value by at least a predetermined value, discrimination of cylinders is performed.

21 Claims, 6 Drawing Sheets

METHOD AND APPARATUS FOR DETECTING REFERENCE ROTATIONAL ANGLE FOR EACH CYLINDER IN MULTIPLE-CYLINDER INTERNAL COMBUSTION ENGINE

BACKGROUND OF THE INVENTION (1) Field of the Invention

The present invention relates to a method and apparatus for detecting reference rotational angles in a multiple-cylinder internal combustion engine. More particularly, the present invention relates to a method and apparatus for detecting the reference rotational angles, by which it is possible to judge that a specific cylinder is at a specific stroke.

(2) Description of the Related Art

A crank angle sensor has heretofore been used for making various controls, for example, the control of the ignition timing, in an internal combustion engine.

There are known various systems for making various controls for the engine, for example, the control of the ignition timing, in cylinders by using crank angle sensors, and recently, there is often adopted a system in which a crank angle sensor having only a function of outputting a reference pulse signal at a specific crank angle (a reference rotational angle) position during a specific stroke of each cylinder synchronously with the revolution of the engine is used and the ignition timing is computed based on the detected reference pulse signal by a microcomputer (see Japanese Utility Model Application No. 62-133304).

The reason for adoption of this system is that it is not necessary to impart a function of generating a unit signal at every crank angle of 1 to 2 to the crank angle sensor and the cost can be advantageously reduced.

However, in the case where an electric current for ignition is electronically applied to each cylinder without using a mechanical distributer or in the case where not only the ignition timing control system but also a system for injecting a fuel to respective cylinders independently is adopted, it is necessary to obtain not only a reference pulse signal but also a signal for judging that a specific cylinder is at a specific stroke (hereinafter referred to as "independent judgement for each cylinder") and therefore, at least two systems become necessary for a group comprising a pickup device and a signal-processing circuit. Accordingly, reduction of the cost is limited.

SUMMARY OF THE INVENTION

Under this background, it is therefore a primary object of the present invention to provide a method and apparatus for detecting a rotational angle of an engine, in which necessary informations concerning the reference rotational angle of the engine are obtained by a single pickup device or a crank angle sensor, and both of discrimination of cylinders and detection of the reference rotational angle of the engine can be performed by processing the obtained informations by a microcomputer.

Another object of the present invention is to provide a method and apparatus for detecting a reference rotational angle of an engine, in which a minimum improvement is made in a known single pickup device or a crank angle sensor having a function of outputting a reference pulse signal at a position of a predetermined rotational angle of an engine at a specific stroke of each cylinder synchronously with the revolution of the engine and both of discrimination of cylinders and detection of the rotational angle of the engine can easily be performed by this improved single pickup device or the sensor.

More specifically, in accordance with one fundamental aspect of the present invention, there is provided a method for detecting the reference rotational angle for each cylinder in a multiple-cylinder internal combustion engine, which comprises outputting a reference pulse signal at a position of a predetermined rotational angle of the engine at a specific stroke of each cylinder synchronously with the revolution of the engine, putting out a cylinder-discriminating pulse signal of a predetermined amplitude in the same output line as of the reference pulse signal just after termination of one of the reference pulse signal, detecting and storing the precedent and present values of an element, concerning the time, of the pulse signal, and performing discrimination of the cylinder when the present value is smaller than the precedent value by at least a predetermined value.

In this detection method, as the element concerning the time, there can be mentioned the time width of the pulse signal and the period of the pulse signal. It is preferred that discrimination of the cylinder be performed when of these pulse signals, the present value of the element concerning the time is smaller than the precedent value by at least a maximum variation ratio of the revolution expected at the time of abrupt acceleration of the engine.

For example, in case of no-load racing of the engine where the most remarkable variation of the engine revolution may be found, the above-mentioned maximum variation ratio of the revolution is about 30%, and therefore, if the detected present value is smaller than 70% of the precedent value, the subsequent reference pulse signal is not misjudged for the cylinder-discriminating signal by the variation in the engine even when the maximum engine revolution variation is caused. In order to prevent the judgement mistake of the cylinder-discriminating pulse signal for the reference pulse signal, it is preferred that at a constant rotational speed of the cylinder-discriminating signal should have an element concerning the time, which is smaller than the same of the just precedent reference pulse signal by at least the maximum rotation variation ratio of the engine expected at the time of abrupt acceleration of the engine, for example, by 30%.

As another element of the pulse signal concerning the time, there can be mentioned the time ratio between the pulse width and the spacing to the subsequent pulse.

As means for carrying out the above-mentioned detection process, in accordance with another aspect of the present invention, there is provided an apparatus for detecting the reference rotational angle for each cylinder in a multiple-cylinder internal combustion engine, which comprises reference signal output means for outputting a reference pulse signal at a position of a predetermined rotational angle of the engine at a specific stroke of each cylinder synchronously with the revolution of the engine, cylinder-discriminating signal output means for outputting a cylinder-discriminating pulse signal on the same output line as of the reference pulse signal just after termination of specific one of the reference pulse signals, timer means for measuring an element, concerning the time, of the pulse signal at every rising or falling of an output waveform of each pulse signal, means for storing precedent and present values of the element concerning the time measured by the timer means, means for comparing the precedent and present values, and cylinder-discriminating means for performing discrimination of cylinders when the ratio of the present value to the precedent value is smaller than a predetermined value.

In accordance with another aspect of the present invention, there may be provided a method for detecting the reference rotational angle for each cylinder, which comprises outputting a reference pulse signal at a predetermined engine rotational angle position at a specific stroke of each cylinder synchronously with the revolution of the engine, outputting a cylinder-discriminating pulse signal of a predetermined amplitude on the same output line as of the reference pulse signal just after termination of one reference pulse signal, computing the ratio between the pulse time width of said pulse signal and the time width between the subsequent pulse signal and the preceding pulse signal and performing discrimination of the cylinder when said ratio is smaller than a predetermined value.

In accordance with still another aspect of the present invention, there is provided an apparatus for detecting the reference rotational angle for each cylinder in a multiple-cylinder internal combustion engine, which comprises a rotary body rotating synchronously with the revolution of the engine, first deformed portions for generating reference pulse signals, which are formed by partial changes of the shape of the rotary body in the same number as the number of the cylinders at positions on the rotary body, corresponding to predetermined engine rotational angle positions at specific stroke of the respective cylinders, said positions of the first deformed portions being substantially equal to one another with respect to the radius distance from an axis of rotation of the rotatable body, a second deformed portion comprising the same deformation element as that of the first deformed portions and indicating that specific one of the first deformed portions corresponds to the specific cylinder, said second deformed portion being formed just after said specific one of first deformed portions at the radius distance substantially equal to that of the first deformed portions, pulse signal-generating means arranged adjacently to rotation loci of the first and second deformed portions to generate a reference pulse signal corresponding to the first deformed portion and a cylinder-discriminating pulse signal corresponding to the second deformed portion in cooperation with the deformed portions, and cylinder-discriminating means for discriminating the cylinders by comparing the reference pulse signal and the cylinder-discriminating pulse signal with respect to an element concerning the time.

It is preferred that the first and second deformed portions be slits, and in this case, it is preferred that the pulse signal-generating means be a photoelectric pickup comprising a light projector and a light receiver.

The cylinder-discriminating means makes a judgement based on elements concerning the time, such as the pulse time widths and periods, in the precedent and subsequent pulse signals. The deformed portions having influences on such elements concerning the time can be formed so that the second deformed portion is smaller than the precedent first deformed portion in the angle range of the deformed portion, the angle range between the adjacent deformed portions or the angle range of the initial or terminal stage of the deformed portion, by at least the maximum rotation variation ratio expected at abrupt acceleration of the engine.

Accordingly, in the case where the pulse time width, the time width between adjacent pulses or the pulse period, which is smaller than the precedent value by at least the maximum rotation variation ratio expected at abrupt acceleration is detected, it can be judged that the pulse signal is a pulse signal for discrimination of the cylinder without fail.

The cylinder-discriminating means can be constructed so that the pulse widths of the precedent pulse signal and the time width between the precedent pulse signal and subsequent pulse signal are detected and the ratio between the pulse width and time width is calculated, and when the calculated ratio is smaller than a predetermined value, it is judged that the subsequent pulse signal giving the present value is the cylinder-discriminating pulse signal.

Embodiments of the present invention will now be described with reference to the accompanying drawings. The present invention will be understood from these embodiments, but the scope of the present invention is not limited by these embodiments.

DETAILED DESCRIPTION OF THE PREFERRED EMBODIMENTS

Figure 1:
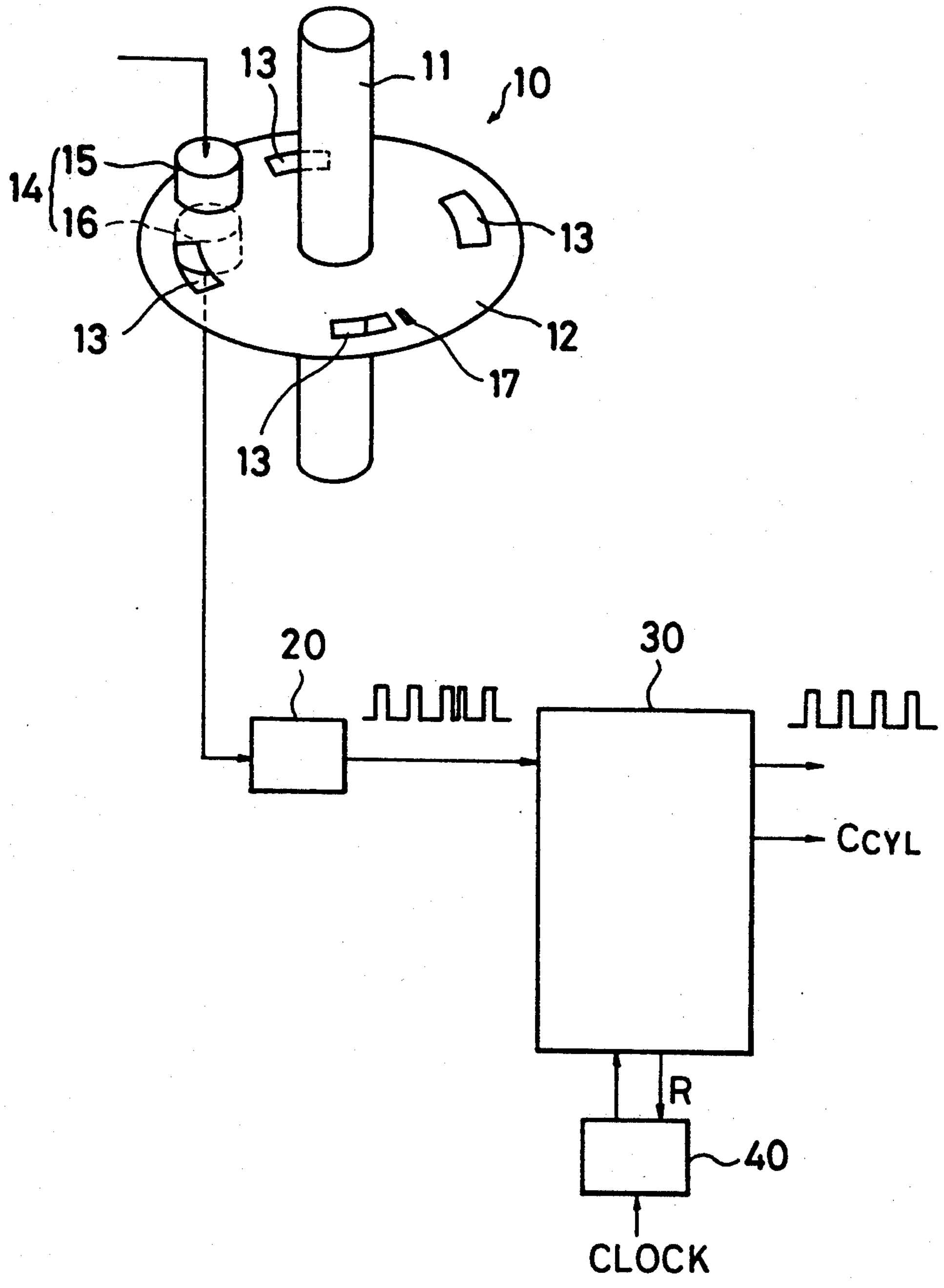
FIG. 1 is a diagram of a crank angle sensor and a single-processing circuit, which illustrates one embodiment of the present invention.

FIG. 1 is an apparatus for detection of the rotational angle in a spark-ignition reciprocating multiple-cylinder internal combustion engine. In case of, for example, a four-cylinder engine, a crank angle sensor 10 for picking up the rotational angle of the engine comprises a signal disk plate 12 as the rotary body, which is attached to a rotation shaft making ½ rotation per rotation of the engine, for example, a distributer shaft or cam shaft 11, so that the signal disk plate 12 rotates in the plane orthogonal to the rotation shaft integrally with the rotation shaft. Fan-shaped slits 13 are formed at equal angle intervals in the circumferential direction on the signal disk plate 12 in the same number as the number of cylinders (four slits in this embodiment because the engine is the four-cylinder engine), and the same radius distance from the rotation axis. A light projector (LED) 15 and a light receiver (photodiode), 16, which constitute a photoelectric pickup 14, are arranged adjacently to rotation loci of slits 13, i.e., on both the sides of the signal disk plate 12 which is interposed between the projector and light receiver. When the slit 13 passes between the projector and receiver, the light emitted from the projector 15 is received by the light receiver 16, and in other case, the light is intercepted by the signal disk plate 12. When the light receiver 16 receives the light, a pulse signal is emitted by the light receiver 16.

Accordingly, reference pulse signals are generated at predetermined crank angle positions at a specific stroke synchronously with the revolution of the engine at the same period as the period of ignitions of cylinders by the ignition plugs. In the present embodiment, each reference pulse signal REF is generated in the region of 70° from the point of 75° to the point of 5° before the compression top dead center (TDC) in each cylinder (see FIG. 2).

In addition to the reference pulse signal-generating slits 13, one cylinder-discriminating signal-generating slit 17 is formed on the signal disk plate 12 at a just rear portion of the specific one of slits 13 and at the same radius position from the rotation axis as that of the slits 13.

Figure 2:
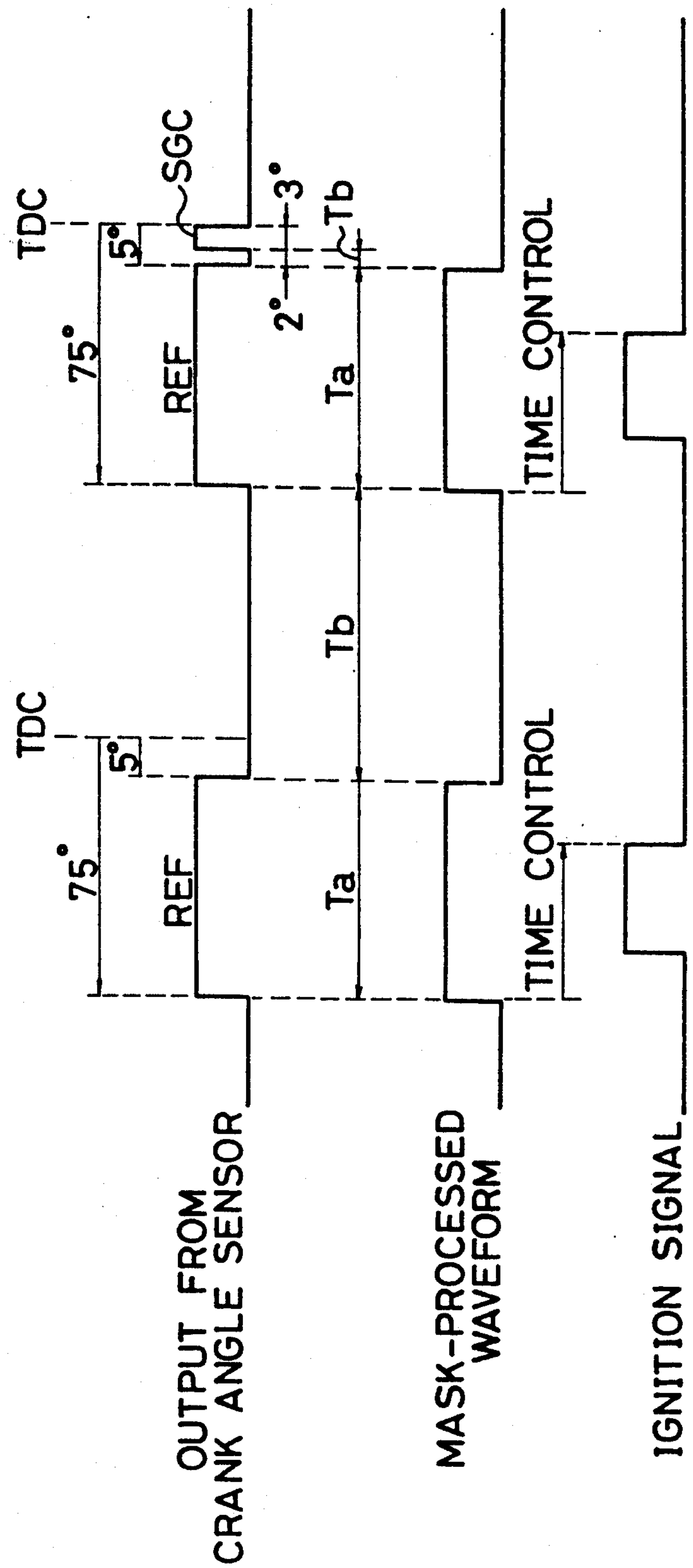
FIG. 2 is a diagram showing waveforms of signals.

More specifically, the fan-shaped slit 17 is formed so that the cylinder-discriminating pulse signal SGC is output on the same output line as of the reference pulse signals REF just after termination of one of the reference pulse signals REF (FIG. 2). This slit 17 constitutes the cylinder-discriminating pulse signal output means.

In this embodiment, the crank angle from the point of termination of the reference pulse signal REF to the point of emission of the cylinder-discriminating pulse signal SGC is adjusted to 2. The crank angle corresponding to the pulse time width of the cylinder-discriminating pulse signal SGC is adjusted to 3 (see FIG. 2).

The signals from the crank angle sensor (pickup device) 10 are shaped by a waveform-shaping circuit 20 and input to a microcomputer 30 comprising an input-processing device, CPU, a store device and the like, and the signals are processed by the microcomputer 30. A timer (timer counter) 40 for counting clock signals output the counted signals to the microcomputer 30, and the count value is reset by the microcomputer 30. Timer means to be used instead of the timer can be constructed by a soft ware.

Figure 3:
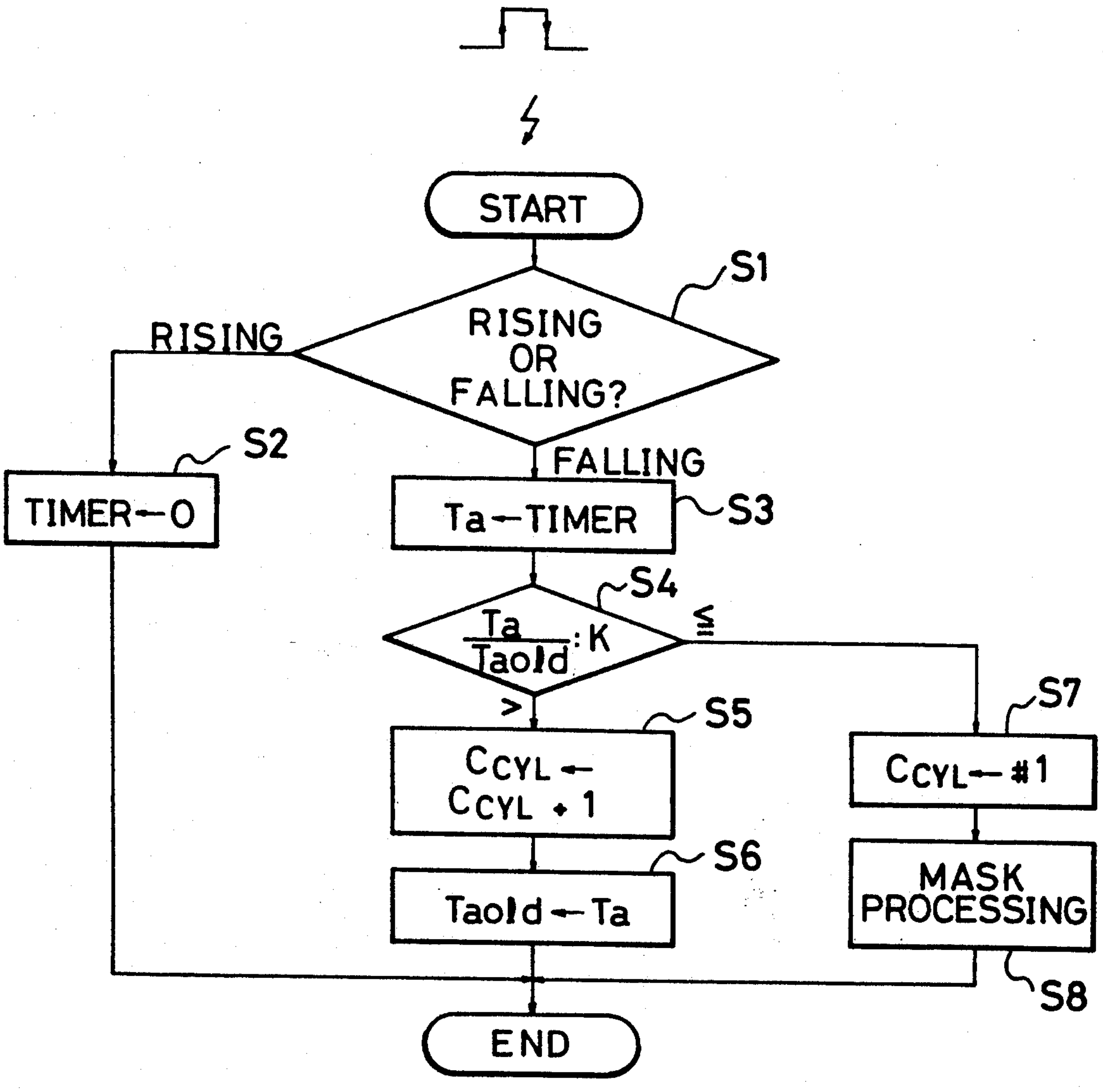
FIG. 3 is a flow chart of a cylinder-discriminating routine of the present invention.

FIG. 3 shows a routine of discrimination of the cylinders performed by the microcomputer 30.

The cylinder-discriminating operation of this routine is performed when rising or falling of the pulse signal from the crank angle sensor 10 is detected.

At step 1 (indicated as "S1" in the drawings; the same will apply hereinafter), the pulse signal from the crank angle sensor 10 is received and it is judged whether the pulse signal is in the rising state or in the falling state. When the pulse signal is in the rising state, the routine goes to step 2 then the timer (timer counter) 40 is reset and restarted, and the operation of this routine is completed. When it is judged that the pulse signal is in the falling state, the routine goes to step 3, and the value of the timer 40 is read as Ta in the memory. Thus, the pulse width (the time of H level) of the pulse signal is stored as Ta in the memory.

Then the routine goes to step 4, and the ratio $Ta/Ta_{old}$ of the present pulse time width Ta to the precedent pulse time width is determined and compared with the predetermined value K.

If the falling of the pulse signal is the falling of the reference pulse signal REF, because of $Ta \geqq Ta_{old}$, the value of $Ta/Ta_{old}$ becomes large. If the falling of the pulse signal is the falling of the cylinder-discriminating pulse signal SGC, because of $Ta < Ta_{old}$, the value of $Ta/Ta_{old}$ becomes small.

Accordingly, if $Ta/Ta_{old} > K$ is judged at step 4, the falling signal is regarded as the falling signal of the reference pulse signal REF, and the routine goes to step 5 and the value of the cylinder-discriminating counter Ccyl is increased by 1. The count value n of the cylinder-discriminating counter Ccyl indicates that the n-th cylinder is at a specific stroke, for example, at the compression stroke. When the count value of the cylinder-discriminating counter Ccyl exceeds the number of the cylinders, the count value is restored to 1. Then the routine goes to step 6 and the precedent value $Ta_{old}$ in the memory is substituted for the present value Ta.

In case of $Ta/Ta_{old} \leqq K$, the falling signal is regarded as the cylinder-discriminating pulse signal SGC, and it is judged that the first cylinder is judged at a specific stroke, for example, the compression stroke, and the routine goes to step 7 and the value of the cylinder-discriminating counter Ccyl is set at 1.

When the cylinder-discriminating pulse signal SGC is thus detected, at subsequent step 8 the pulse signal SGC is subjected to mask processing, and a mask-processed waveform (see FIG. 2) of only the reference pulse signal REF skipping this pulse signal SGC is formed by the microcomputer. After the passage of a predetermined time from the pulse signal, the known-control of ignition of the corresponding cylinder by the ignition plug is carried out based on the mask processed waveform.

Figure 4:
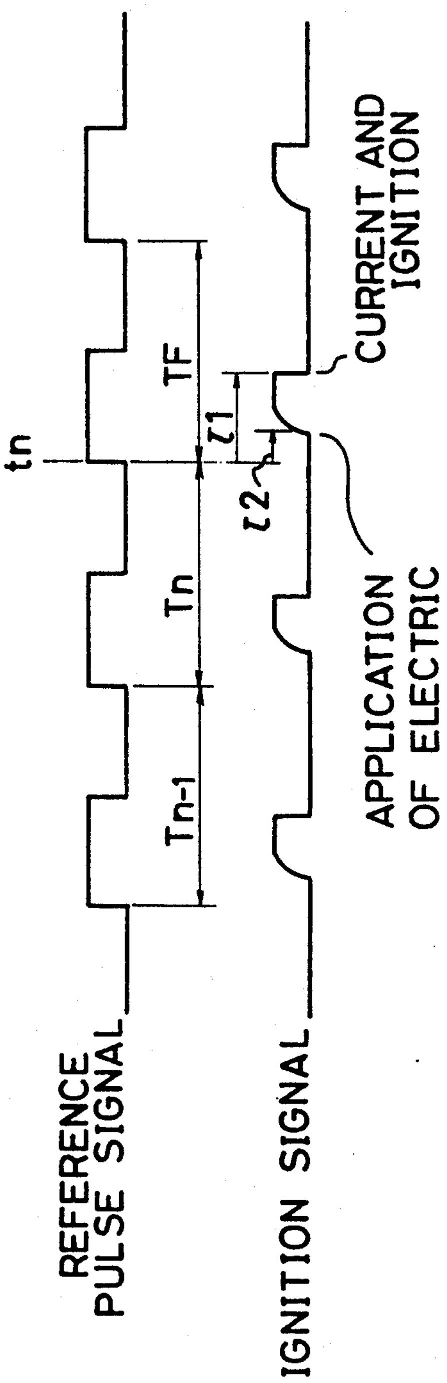
FIG. 4 is a diagram illustrating the ignition control according to the time control system.

More specifically, for example, as shown in FIG. 4, the period of the reference pulse signal is computed based on the rising and falling times of the reference pulse signal detected by the routine, and the change ratio of the period is determined from the precedent period $Tn-1$ and the present frequency Tn and the subsequent period TF is estimated. Based on the subsequent period TF, the required ignition angle is converted to the time, and the reference point tn, that is, the time $\tau 1$ from the point of rising of the reference pulse signal of the corresponding cylinder in the present embodiment. When the time of $\tau 2$ has passed from the reference point tn, application of electricity is started and after the lapse of the time of $\tau 1$, the application of electricity is stopped, whereby ignition of the corresponding cylinder is effected.

As is apparent from the foregoing description, in the present embodiment, the precedent value and the present value of the pulse widths (the time of H level) of the pulse signal are measured, and the ratio of the two widths is determined and compared with the predetermined value K. Thus, it is judged whether the pulse signal is the reference pulse signal or the cylinder-discriminating pulse signal. Alternatively, there can be adopted a method in which another element of the pulse signal concerning the time, for example, the pulse width or pulse frequency, is computed at the time of rising of the pulse signal, the present value is compared with the precedent value, and when the ratio of the two values is smaller than a predetermined value K, it is judged that the pulse signal giving the present value is the cylinder-discriminating pulse signal.

Figure 5:
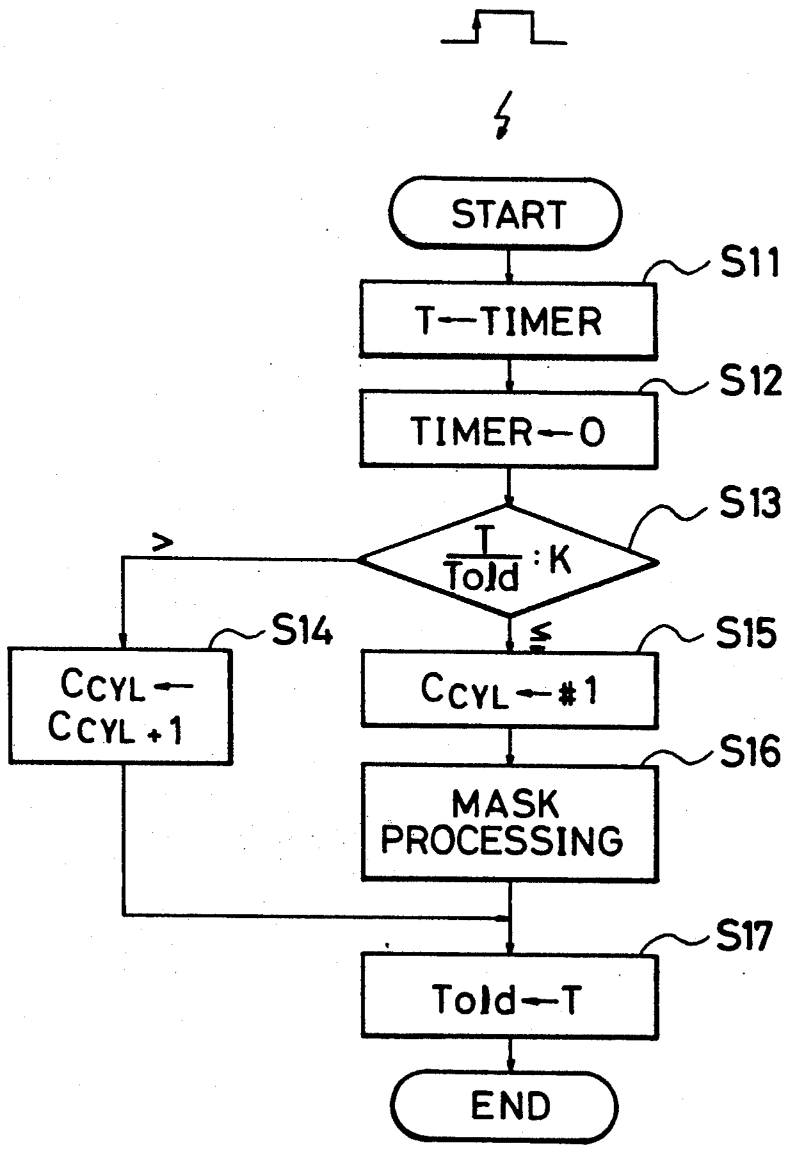
FIG. 5 is a flow chart of another cylinder-discriminating routine of the present invention.

The cylinder-discriminating operation of this routine is shown in FIG. 5 and is performed when rising of the pulse signal from the crank angle sensor 10 is detected.

The pulse signal from crank angle sensor 10 is received and when the pulse signal is in the falling stage, the value of the timer 40 counting the clock signals is read in step 11 as the present period T of the pulse signal in the memory. Then, at step 12, the timer 40 is reset and restarted. Then, the routine goes to step 13, and the ratio $T/T_{old}$ of the present pulse time width to the precedent pulse time width of the pulse signal is determined and compared with the predetermined value K.

If the rising of the pulse signal is the rising of the reference pulse signal REF, because of $T \gtrapprox T_{old}$, the value of $T/T_{old}$ becomes large to approximately be 1. If the rising of the pulse signal is the rising of the cylinder-discriminating pulse signal SGC, because of $T_{old}>T$, the value of $T/T_{old}$ becomes small.

Accordingly, if $T/T_{old}>$judged at step 13, the rising signal is regarded as the rising signal of the reference pulse signal REF, and the routine goes to step 14 and the value of the cylinder-discriminating counter Ccyl is increased by 1. The count value n of the cylinder-discriminating counter Ccyl indicates that the n-th cylinder is at a specific stroke, for example, at the compression stroke. When the count value of the cylinder-discriminating counter Ccyl exceeds the number of the cylinders, the count value is restored to 1.

In case of $T/T_{old}\leqq K$, the rising signal is regarded as the cylinder-discriminating pulse signal SGC, and it is judged that the first cylinder is judged at a specific stroke, for example, the compression stroke, and the routine goes to step 15 and the value of the cylinder-discriminating counter Ccyl is set at 1.

When the cylinder-discriminating pulse signal SGC is thus detected, at subsequent step 16 the pulse signal SGC is subjected to mask processing, and a mask-processed waveform (see FIG. 2) of only the reference pulse signal REF skipping this pulse signal SGC is formed by the microcomputer. After the passage of a predetermined time from the pulse signal, the well-known control of ignition of the corresponding cylinder by the ignition plug is carried out based on the mask-processed waveform.

In these cases of the cylinder-discriminating routines shown in FIGS. 3 and 4, since the pulse width or period of the pulse signal is time-sequentially decreased by the maximum rotation variation ratio (about 30%) at abrupt change of the revolution of the engine, for example, at abrupt acceleration of the engine by no-load racing or the like, this reduction should be taken into consideration.

In the case where the judgement is made by using the pulse width of the pulse signal, the rotational angle of the engine (crank angle) corresponding to the pulse width of the cylinder-discriminating pulse signal, that is, the angle of the slit 17 about the rotational axis, is made smaller than the angle (crank angle) corresponding to the pulse width of the reference pulse signal by at least the maximum rotation variation ratio (at least 30%), or in the case where discrimination of the cylinders is carried out by using the period of pulse signals, the angle about the rotational axis corresponding to the frequency of the precedent reference pulse signal and the cylinder-discriminating pulse signal, that is, the respective angle between the start or end of the slit 13 and the start or end of the slit 17, is made smaller than the angle corresponding to the period of the reference pulse signals by at least the maximum rotation variation ratio (at least 30%).

In this case, even if the engine rotation variation ratio shows a maximum value, the pulse width of the sequent reference pulse signal or the period of the sequent reference pulse signals is decreased from the same at the constant revolution of the engine only by the maximum engine rotation variation ratio, and therefore, the pulse width or the period of the subsequent reference pulse signal does not become smaller than the pulse width of the cylinder-discriminating pulse signal or the period between the reference pulse signal and the subsequent cylinder-discriminating signal. Accordingly, erroneous judgement of the cylinder-discriminating pulse signal for the reference pulse signal is not made at all.

Further, in the precedent discussion, the judgement whether the pulse signal is the reference pulse signal or the cylinder-discriminating pulse signal is performed by using the element of the pulse signal concerning the time, for example, the pulse width or pulse period. Alternatively, however there can be adopted a method in which the pulse width (the time of H level—precedent value) of the pulse signal and the time width (the time of L level—present value) between the pulse signals are measured, and the ratio of the two widths is determined and compared with the predetermined value. And when the ratio of the two values is smaller than a predetermined value, it is judged that the pulse signal giving the present value is the cylinder-discriminating pulse signal.

Figure 6:
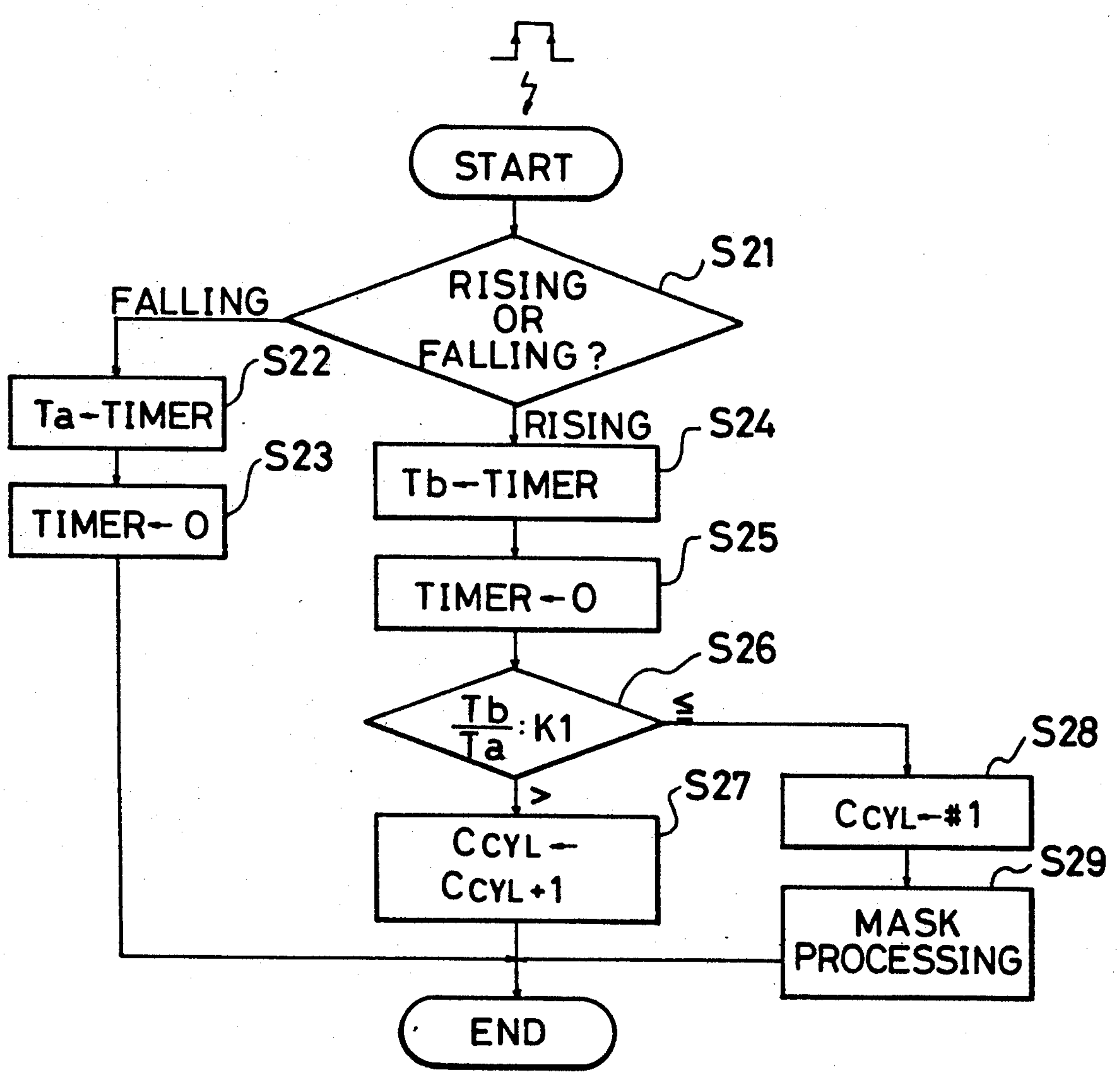
FIG. 6 is a flow chart of still another cylinder-discriminating routine of the present invention.

The cylinder-discriminating operation of this routine is shown in FIG. 6.

This routine is performed when rising or falling of the pulse signal from the crank angle sensor 10 is detected.

At step 21, the pulse signal from the crank angle sensor 10 is received and it is judged whether the pulse signal is in the rising state or in the falling state. When the pulse signal is in the falling stage, the routine goes to step 22 and the value of the timer (timer counter) 40 counting the clock signals is read as Ta in a memory. Then, at step 23, the timer 40 is reset and restarted, and the operation of this routine is completed. When it is judged that the pulse signal is in the rising state, the routine goes to step 24, and the value of the timer 40 is read as Tb in the memory. Then, at step 25, the timer 40 is reset and restarted. Thus, the pulse width (the time of H level) of the pulse signal is stored as the precedent value Ta in the memory, and the time width (the time of L level) between the present and subsequent pulse signals is stored as the present value Tb in the memory.

In the case where the pulse signal is in the rising state, the routine goes to step 26, and the ratio Tb/Ta of the time width (the time of L level) Tb between the pulse signals to the pulse width (the time of H level) ta of the pulse signal is determined and compared with the predetermined value K1.

If the rising of the pulse signal is the rising of the reference pulse signal REF, because of Ta<Tb, the value of Tb/Ta becomes large. If the rising of the pulse signal is the rising of the cylinder-discriminating pulse signal SGC, because of Ta≧Tb, the value of Tb/Ta becomes small.

Accordingly, if Tb/Ta>K is judged at step 26, the rising signal is regarded as the rising signal of the reference pulse signal REF, and the routine goes to step 27 and the value of the cylinder-discriminating counter Ccyl is increased by 1. The count value n of the cylinder-discriminating counter Ccyl indicates that the n-th cylinder is at a specific stroke, for example, at the compression stroke. When the count value of the cylinder-discriminating counter Ccyl exceeds the number of the cylinders, the count value is restored to 1.

In case of Tb/Ta≦K1, the rising signal is regarded as the cylinder-discriminating pulse signal SGC, and it is judged that the first cylinder is judged at a specific stroke, for example, the compression stroke, and the routine goes to step 28 and the value of the cylinder-discriminating counter Ccyl is set at 1.

When the cylinder-discriminating pulse signal SGC is thus detected, at subsequent step 29 the pulse signal SGC is subjected to mask processing, and a mask-processed waveform (see FIG. 2) of only the reference pulse signal REF skipping this pulse signal SGC is formed by the microcomputer. After the passage of a predetermined time from the pulse signal, the known control of ignition of the corresponding cylinder by the ignition plug is carried out based on the mask-processed waveform.

In the present embodiment, reference pulse signals and cylinder-discriminating signals are generated by slits 13 and 17 formed on the signal disk plate in cooperation with the photoelectric pickup device. Projections can be formed instead of the slits for generation of these pulse signals. In short, it is sufficient if deformed portions are formed on the rotary body for picking up pulse signals. Incidentally, the same deformed elements, for example, space elements such as slits, or protrusions, are preferably formed for both of reference pulse signals and cylinder-discriminating pulse signals.

As is apparent from the foregoing description, according to the present invention, there can be provided a method an apparatus for detecting the reference rotational angle of the engine, in which signals for discrimination of cylinders can easily be obtained by a simple structure of one pickup system. Especially, this can be accomplished only by adding a cylinder-discriminating pulse signal-generating deformed portion consisting the same element as that of the reference pulse signal-generating deformed portion to the conventional disk plate after one of the reference pulse signal-generating deformed portions. Accordingly, the conventional system can be improved very easily and simply and detection of the reference rotational angle of the engine to be used for control of ignition or the like and discrimination of cylinders can be accomplished by one pickup device. Therefore, the cost can be reduced and the present invention is very advantageous from the economical viewpoint.

We claim:

1. A method for detect'ng a reference rotational angle for each cylinder in a multiple-cylinder internal combustion engine, which comprises outputting a reference pulse signal at a position of a predetermined rotational angle of the engine at a specific stroke of each cylinder synchronously with the revolution of the engine, outputting a cylinder-discriminating pulse signal of a predetermined amplitude in the same output line as said reference pulse signal just after termination of one of said reference pulse signals, detecting and storing precedent and present values of elements, concerning the time, of said pulse signals, calculating the ratio of said present value to said precedent value, and performing discrimination of said cylinder when said ratio is smaller than a predetermined constant value.

2. A method for detecting a reference rotational angle for each cylinder in a multiple-cylinder internal combustion engine according to claim 1, wherein said element concerning the time of said pulse signal is a pulse width of said pulse signal.

3. A method for detecting a reference rotational angle for each cylinder in a multiple-cylinder internal combustion engine according to claim 1, wherein said element concerning the time of said pulse signal is a period of said pulse signal.

4. A method for detecting a reference rotational angle for each cylinder in a multiple-cylinder internal combustion engine, which comprises outputting a reference pulse signal at a position of a predetermined rotational angle of the engine at a specific stroke of each cylinder synchronously with the revolution of the engine, outputting a cylinder-discriminating pulse signal of a predetermined amplitude in the same output as said reference pulse signal just after termination of one of said reference pulse signals, detecting and storing precedent and present values of elements, concerning the time, of said pulse signals, calculating the ratio of said present value to said precedent value, and performing discrimination of said cylinder when said ratio is smaller than a predetermined constant value;

wherein said cylinder-discriminating pulse signal at a constant rotational speed of the engine has an element concerning the time, which is smaller than the element concerning the time of said precedent reference pulse signal by at least the maximum rotation variation ratio of the engine expected at an abrupt acceleration of the engine and said predetermined value is smaller than the precedent value by at least the maximum rotation variation ratio expected at an abrupt acceleration of the engine.

5. A method for detecting a reference rotational angle for each cylinder in a multiple-cylinder internal combustion engine, which comprises outputting a reference pulse signal at a predetermined engine rotational angular position at a specific stroke of each cylinder synchronously with the revolution of the engine, outputting a cylinder-discriminating pulse signal of a predetermined amplitude on the same output line as said reference pulse signal just after termination of one of reference pulse signals, computing the ratio between the pulse time width of said pulse signal and the time width between the subsequent pulse signal and the precedent pulse signal and performing discrimination of the cylinder when said ratio is smaller than a predetermined constant value.

6. An apparatus for detecting a reference rotational angle for each cylinder in a multiple-cylinder internal combustion engine, which comprises reference signal output means for putting out a reference pulse signal at a position of a predetermined rotational angle of the engine at a specific stroke of each cylinder synchronously with the revolution of the engine, cylinder-discriminating signal output means for outputting a cylinder-discriminating pulse signal on the same output line as said reference pulse signal just after termination of one of said reference pulse signals, timer means for measuring an element, concerning the time, of each of said pulse signals at every rising and falling of an output waveform of each pulse signal, means for storing precedent and present values of said element concerning the time measured by the timer means, means for calculating the ratio of said present to said precedent values, and cylinder-discriminating means for performing discrimination of cylinders when the ratio of said present value to said precedent value is smaller than a predetermined constant value.

7. An apparatus for detecting a reference rotational angle for each cylinder in a multiple-cylinder internal combustion engine according to claim 6, wherein said element concerning the time in said timer means is a time width of said pulse signal.

8. An apparatus for detecting a reference rotational angle for each cylinder in a multiple-cylinder internal combustion engine according to claim 6, wherein said element concerning the time in said timer means is a period of said pulse signal.

9. An apparatus for detecting a reference rotational angle for each cylinder in a multiple-cylinder internal combustion engine, which comprises reference signal output means for putting out a reference pulse signal at a position of a predetermined rotational angle of the engine at a specific stroke of each cylinder synchronously with the revolution of the engine, cylinder-discriminating signal output means for outputting a cylinder-discriminating pulse signal on the same output line as said reference pulse signal just after termination of one of said reference pulse signals, timer means for measuring an element, concerning the time, of each of said pulse signals at every rising and falling of an output waveform of each pulse signal, means for storing precedent and present values of said element concerning the time measured by the timer means, means for calculating the ratio of said present to said precedent values, and cylinder-discriminating means for performing discrimination of cylinders when the ratio of said present value to said precedent value is smaller than a predetermined constant value;

wherein said cylinder-discriminating pulse signal at a constant rotational speed of the engine has an element concerning the time, which is smaller than the element concerning the time of said precedent reference pulse signal by at least the maximum rotation variation ratio of the engine expected at an abrupt acceleration of the engine and said predetermined value is smaller than the precedent value by at least the maximum rotation variation ratio expected at an abrupt acceleration of the engine.

10. An apparatus for detecting a reference rotational angle for each cylinder in a multiple-cylinder internal combustion engine, which comprises reference signal output means for outputting a reference pulse signal at a position of a predetermined rotational angle of the engine at a specific stroke of each cylinder synchronously with the revolution of the engine, cylinder-discriminating signal output means for outputting a cylinder-discriminating pulse signal on the same line as said reference pulse signal just after termination of one of said reference pulse signals, timer means for measuring an element, concerning the time, of each of said pulse signals at every rising and falling of an output waveform of each pulse signal, means for comparing the ratio of said element concerning the time of each pulse signal, measured by said timer means, with the element concerning the time of the precedent pulse signal, and cylinder-discriminating means for performing discrimination of cylinders when said ratio is lower than a predetermined constant value.

11. An apparatus for detecting a reference rotational angle for each cylinder in a multiple-cylinder internal combustion engine, which comprises a rotary body rotating synchronously with the revolution of the engine, first deformed portions for generating reference pulse signals, which are formed on the rotary body by partial changes of the shape of said rotary body in the same number as the number of the cylinders at positions on said rotary body, corresponding to predetermined engine rotational angular positions at specific strokes of the respective cylinders, said positions of said first deformed portions being substantially equal to one another with respect to a radial distance from the rotational axis of said rotary body, one second deformed portion comprising the same deformation element as that of said first deformed portions and indicating that specific one of the first deformed portions corresponds to the specific cylinder, said second deformed portion being formed circumferentially just after said one first deformed portion at a radial distance substantially equal to that of the first deformed portions, pulse signal-generating means arranged adjacently to rotation loci of the first and second deformed portions to generate a reference pulse signal corresponding to said first deformed portion and a cylinder-discriminating pulse signal corresponding to said second deformed portion in cooperation with said deformed portions, and cylinder-discriminating means for discriminating the cylinders by comparing the ratio of an element concerning the time of the cylinder-discriminating pulse signal and an element concerning the time of the reference pulse signal to a predetermined constant.

12. An apparatus for detecting a reference rotational angle for each cylinder in a multiple-cylinder internal combustion engine according to claim 11, wherein said rotary body is a rotary disk attached to a cam shaft for driving suction and exhaust valves of an automobile engine.

13. An apparatus for detecting a reference rotational angle for each cylinder in a multiple-cylinder internal combustion engine according to claim 11, wherein said rotary body is a rotary disk attached to a distributer shaft for an ignition device of a spark ignition reciprocating engine for an automobile.

14. An apparatus for detecting a reference rotational angle for each cylinder in a multiple-cylinder internal combustion engine according to claim 11, wherein said deformed elements of said first and second deformed portions are slits formed on said rotary body.

15. An apparatus for detecting a reference rotational angle for each cylinder in a multiple-cylinder internal combustion engine according to claim 14, wherein said pulse signal-generating means comprises a light projector and a light receiver, which are arranged on opposite sides of the rotary body, which is interposed between the projector and receiver.

16. An apparatus for detecting a reference rotational angle for each cylinder in a multiple-cylinder internal combustion engine according to claim 15, wherein said cylinder-discriminating means is constructed so that the period of the precedent pulse signal and the period of the subsequent pulse signal are detected and when the ratio of the present value of the period to the precedent value of the period is smaller than the maximum rotation variation ratio expected at an abrupt acceleration of the engine, it is judged that the subsequent pulse signal giving said present value is the cylinder-discriminating pulse again.

17. An apparatus for detecting a reference rotational angle for each cylinder in a multiple-cylinder internal combustion engine, which comprises a rotary body rotating synchronously with the revolution of the engine, first deformed portions for generating reference pulse signals, which are formed on the rotary body by partial changes of the shape of said rotary body in the same number as the number of the cylinders at positions on said rotary body, corresponding to predetermined engine rotational angular positions at specific strokes of the respective cylinders, said positions of said first deformed portions being substantially equal to one another with respect to a radial distance from the rotational axis of said rotary body, one second deformed portion comprising the same deformation element as that of said first deformed portions and indicating that specific one of the first deformed portions corresponds to the specific cylinder, said second deformed portion being formed circumferentially just after said one first deformed portion at a radial distance substantially equal to that of the first deformed portions, pulse signal-generating means arranged adjacent to rotation loci of the first and second deformed portions to generate a reference pulse signal corresponding to said first deformed portion and a cylinder-discriminating pulse signal corresponding to said second deformed portion in cooperation with said deformed portions, and cylinder-discriminating means for discriminating the cylinders by comparing the ratio of an element concerning the time of the cylinder-discriminating pulse signal and an element concerning the time of the reference pulse signal to a predetermined constant;

wherein an arc length of the second deformed portion is smaller than the arc lengths of the first deformed portions by at least the maximum rotation variation ratio of said rotary body expected at an abrupt acceleration of the engine.

18. An apparatus for detecting a reference rotational angle for each cylinder in a multiple-cylinder internal combustion engine according to claim 15, wherein said cylinder-discriminating means is constructed so that the pulse time widths of the precedent pulse signal and subsequent pulse signal are detected and when the ratio of the present value of the pulse time width to the precedent value of the pulse time width is smaller than the maximum rotation variation ratio expected at an abrupt acceleration of the engine, it is judged that the subsequent pulse signal giving said present value is the cylinder-discriminating pulse signal.

19. An apparatus for detecting a reference rotational angle for each cylinder in a multiple-cylinder internal combustion engine, which comprises a rotary body rotating synchronously with the revolution of the engine, first deformed portions for generating reference pulse signals, which are formed on the rotary body by partial changes of the shape of said rotary body in the same number as the number of the cylinders at positions on said rotary body, corresponding to predetermined engine rotational angular positions at specific strokes of the respective cylinders, said positions of said first deformed portions being substantially equal to one another with respect to a radial distance from the rotational axis of said rotary body, one second deformed portion comprising the same deformation element as that of said first deformed portions and indicating that specific one of the first deformed portions corresponds to the specific cylinder, said second deformed portion being formed circumferentially just after said one first deformed portion at a radial distance substantially equal to that of the first deformed portions, pulse signal-generating means arranged adjacently to rotation loci of the first and second deformed portions to generate a reference pulse signal corresponding to said first deformed portion and a cylinder-discriminating pulse signal corresponding to said second deformed portion in cooperation with said deformed portions, and cylinder-discriminating means for discriminating the cylinders by comparing the ratio of an element concerning the time of the cylinder-discriminating pulse signal and an element concerning the time of the reference pulse signal to a predetermined constant;

wherein an angular spacing from the rotational axis of said rotary body between said second deformed portion and the just precedent first deformed portion is smaller than that between said precedent first deformed portion and the subsequent other first deformed portion by at least the maximum rotation variation ratio expected at an abrupt acceleration of the engine.

20. An apparatus for detecting a reference rotational angle for each cylinder in a multiple-cylinder internal combustion engine according to claim 16, wherein the cylinder-discriminating means comprises timer means for counting said element, concerning the time, of said pulse signals at every rising and falling of said pulse signals, means for storing said element concerning the time, counted by said timer means, and wherein said cylinder-discriminating means discriminates the cylinders when said ratio is smaller than a predetermined constant value.

21. An apparatus for detecting a reference rotational angle for each cylinder in a multiple-cylinder internal combustion engine according to claim 16, wherein said cylinder-discriminating means is constructed so that the pulse width of the precedent pulse signal and the time width between the precedent pulse signal and subsequent pulse signal are detected, and the ratio between said pulse width and time width is calculated, and when the calculated ratio is smaller than a predetermined constant value, it is judged that the subsequent pulse signal is the cylinder-discriminating pulse signal.

* * * * *

UNITED STATES PATENT AND TRADEMARK OFFICE

CERTIFICATE OF CORRECTION

PATENT NO. : 5,196,844

DATED : March 23, 1993

INVENTOR(S) : TOMISAWA et al.

It is certified that error appears in the above-identified patent and that said Letters Patent is hereby corrected as shown below:

On the title page, item [73] should read as follows:

--[73] Assignees: Japan Electronic Control Systems Company, Ltd Isesaki-shi, Japan and Nissan Motor Company, Ltd., Yokohama-shi, Japan--

Signed and Sealed this

Eighth Day of July, 1997

Attest:

BRUCE LEHMAN

*Attesting Officer* *Commissioner of Patents and Trademarks*